Figure 1:
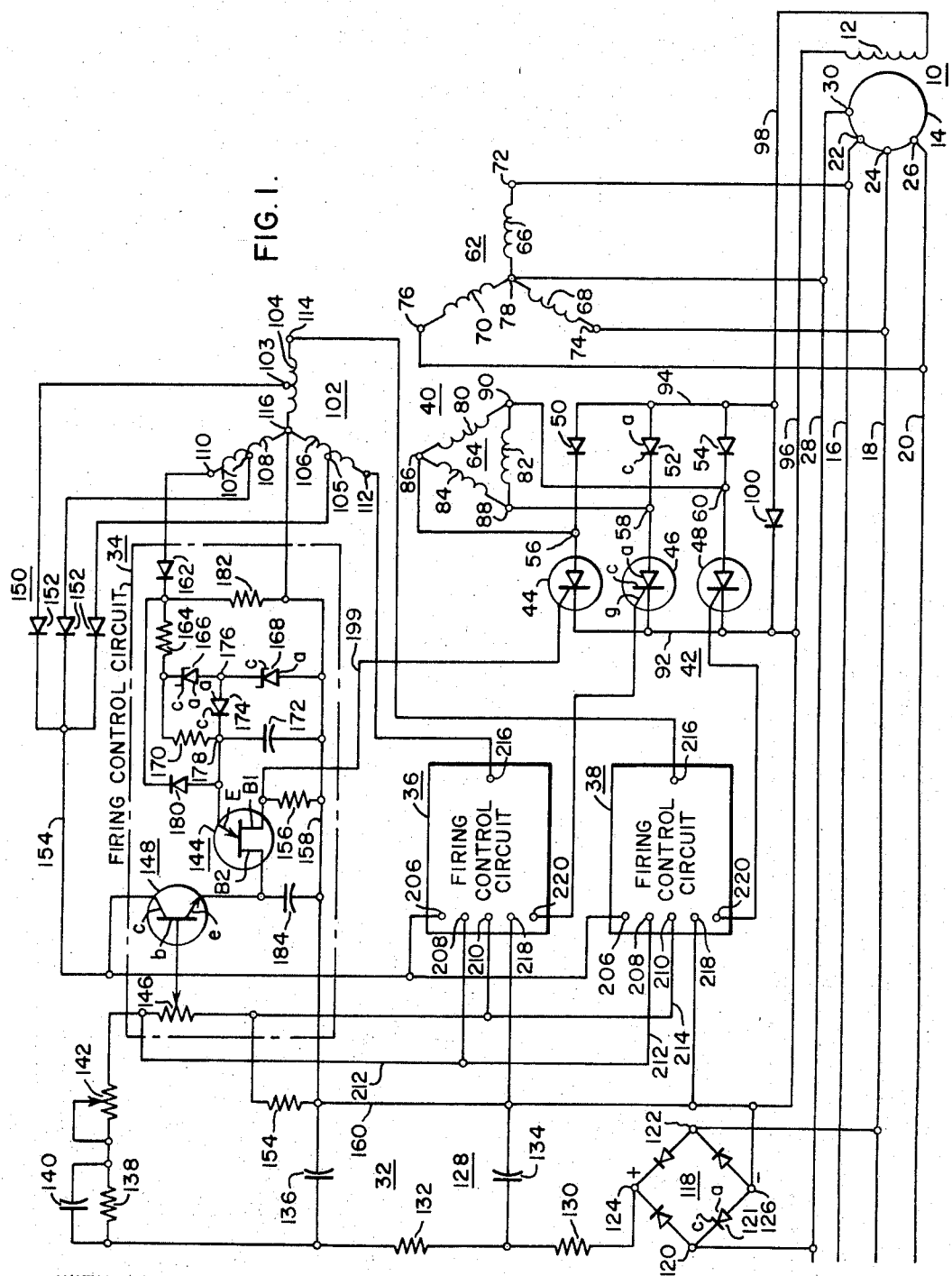

Nov. 7, 1967      L. L. TIPTON      3,351,843
ELECTRICAL APPARATUS

Filed Sept. 14, 1964      2 Sheets-Sheet 1

FIG. I.

WITNESSES:
Bernard R. Giegner
Leon M. Garman

INVENTOR
Lynn L. Tipton
BY
Donald R. Lackey
ATTORNEY

United States Patent Office 3,351,843
Patented Nov. 7, 1967

3,351,843
ELECTRICAL APPARATUS
Lynn L. Tipton, American Township, Lima County, Ohio, assignor to Westinghouse Electric Corporation, East Pittsburgh, Pa., a corporation of Pennsylvania
Filed Sept. 14, 1964, Ser. No. 396,122
9 Claims. (Cl. 322—28)

This invention relates in general to voltage regulator circuits and more particularly to voltage regulator circuits for supplying the excitation requirements of a dynamoelectric machine.

Voltage regulators for controlling the excitation requirements of a dynamoelectric machine often utilize controlled rectifiers, such as semiconductor silicon controlled rectifiers, in their power amplifier or power output circuit. These regulators must generate firing signals or voltages and apply them to the control electrode of the controlled rectifiers at the proper point in the half cycle of the electrical quantity being controlled. These firing signals should be continuously variable over the possible conduction angle range and they should be synchronized with the electrical quantity to be controlled, in order to vary the output power from substantially zero to the maximum obtainable. Further, the firing voltage applied to the control electrode of the controlled rectifier should have a wave front that has an extremely fast rise time in order to "turn on" or forward bias the total semiconductor junction area of the controlled rectifier without localized heating in portions of this junction. It is also desirable that the regulator use all static components, be simple in design and construction, and have a high obtainable gain which can be easily determined and selected to have the value desired.

Accordingly, it is an object of this invention to provide a new and improved voltage regulator for dynamoelectric machines.

Another object of this invention is to provide a new and improved voltage regulating system for dynamoelectric machines which utilizes controlled rectifiers in its power output circuit and which provides continuously variable, fast rise time, synchronized firing pulses for controlling the conduction of the controlled rectifiers.

A further object of the invention is to provide a new and improved voltage regulating system for dynamoelectric machines which is completely static and has a high gain which may be easily determined and selected when designing the regulator.

Briefly, the present invention accomplishes the above cited objects by utilizing a unijunction transistor and a capacitor for each controlled rectifier to be fired. The capacitor is charged rapidly from a regulated supply potential through first impedance means of relatively small magnitude until the capacitor reaches the minimum charge voltage required to fire a controlled rectifier. The capacitor should reach this minimum charge voltage at the point in the half cycle of the electrical quantity being controlled, such as voltage, at which the controlled rectifier would have to be fired for maximum obtainable output. The capacitor charging path is changed at this point to include a second impedance means having a relatively large magnitude, thus changing the voltage charging rate of the capacitor to one having a substantially linear, gentle slope. The voltage across the capacitor is applied to the emitter electrode of the unijunction transistor. A unidirectional voltage proportional to the voltage to be regulated is applied across base-two and base-one of the unijunction transistor. When the voltage applied to the emitter of the unijunction transistor equals the voltage applied across base-two and base-one, times a constant $n$ called the intrinsic stand-off ratio of the unijunction transistor, the unijunction transistor is fired, applying the capacitor charge to the control electrode of the controlled rectifier in the form of a steep wave front pulse. The gain of the regulator is determined merely by the value chosen for the second impedance means, and the gain can be high, as the charging rate of the capacitor may have a very gentle, substantially linear slope, requiring only a small change in the sensed voltage to vary the firing angle across the complete control range.

Further objects and advantages of the invention will become apparent as the following description proceeds and features of novelty which characterize the invention will be pointed out in particularity in the claims annexed to and forming a part of this specification.

Figure 2:
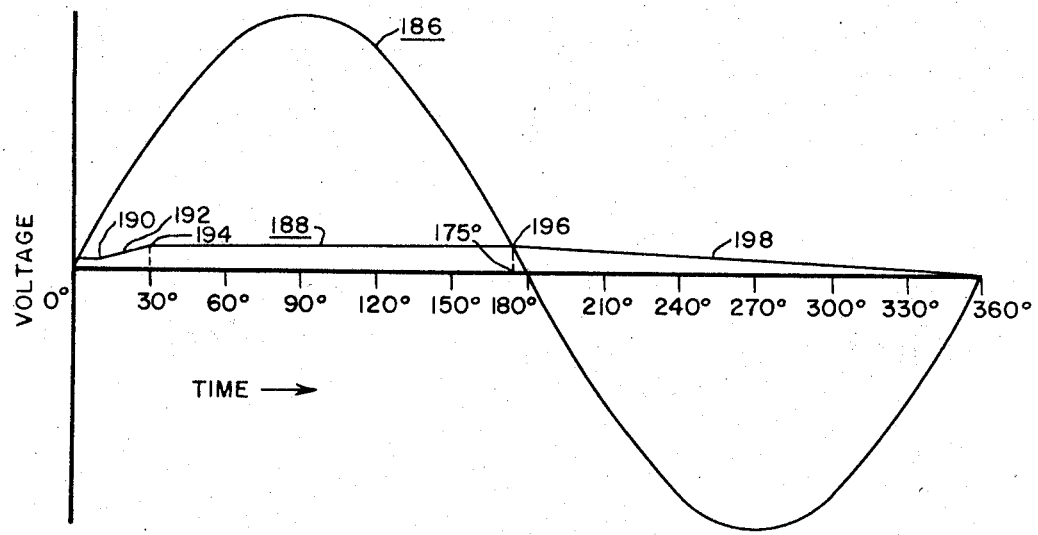
Figure 3:
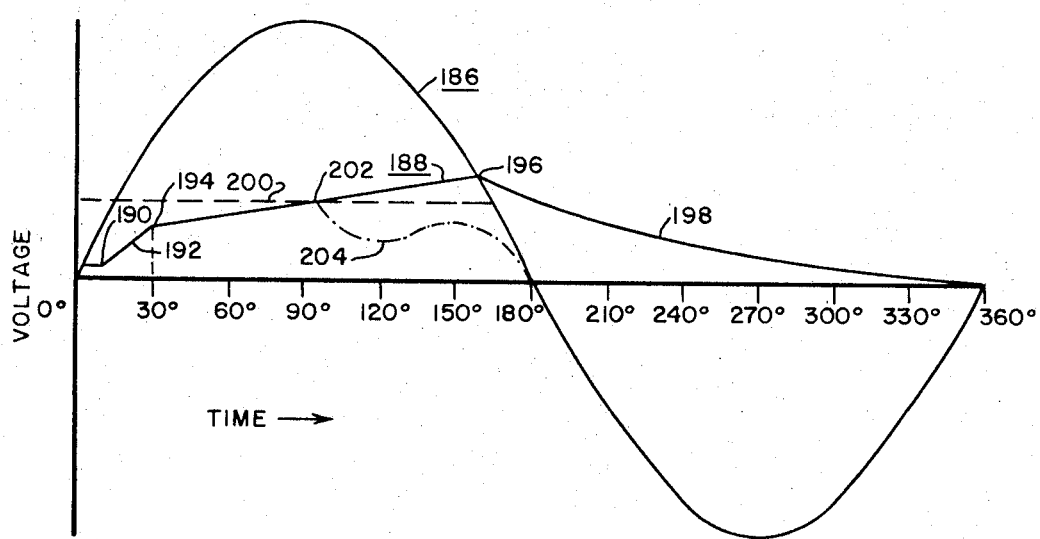

For a better understanding of the invention, reference may be had to the accompanying drawings, in which:

FIGURE 1 is a schematic diagram of a regulating system embodying the teachings of the invention, and FIGS. 2 and 3 are graphs which illustrate voltage waveforms at selected points in the schematic diagram of FIG. 1.

Referring now to the drawings, and FIG. 1 in particular, there is illustrated a dynamoelectric machine, such as a three phase alternating current generator 10, having a field winding 12 and an armature 14. The generator 10 is disposed to supply alternating current energy to line conductors 16, 18 and 20 through output terminals 22, 24 and 26, respectively, of the armature 14. The neutral of the generator 10 may be connected to conductor 28 from terminal 30.

In general, the regulating and excitation circuit comprises sensing means 32 for obtaining a unidirectional signal proportional to the output voltage of generator 10, three similar regulating and firing control circuits 34, 36 and 38, power supply means 40 for obtaining an alternating potential having the desired phase relationship with the alternating output potential of generator 10, and power amplifier means 42 for applying a unidirectional potential to the field winding 12. Since the regulating and firing control circuits 34, 36 and 38 are similar, it will only be necessary to describe one of the circuits in detail, such as regulating and firing control circuit 34.

In particular, the power amplifier means 42, as illustrated, is a three-phase, full-wave rectifier which utilizes three controlled rectifiers, such as silicon controlled rectifiers 44, 46 and 48, each having an anode electrode $a$, cathode electrode $c$ and a gate or control electrode $g$. The power amplifier 42 also includes three rectifiers, such as silicon rectifiers 50, 52 and 54, each having an anode electrode $a$ and cathode electrode $c$. Although, the power amplifier is illustrated as being a three-phase, full-wave rectifier, it will be understood that it may also be a three-phase, half-wave rectifier, utilizing three controlled rectifiers, or it may be single phase, if desired.

Each of the controlled rectifiers 44, 46 and 48 requires an individual firing control circuit having the desired phase relationship with the particular electrical quantity it is to control, with regulating and firing control circuit 34 serving controlled rectifier 44, regulating and firing control circuit 36 serving controlled rectifier 46, and regulating and firing control circuit 38 serving controlled rectifier 48. In order to supply an alternating potential to the input terminals 56, 58 and 60 of power amplifier 42, synchronized with the alternating output potential of the generator 10, a transformer 40, having a primary winding 62 connected to the output terminals of generator 10 and a secondary winding 64 connected to power amplifier 42, may be used. Primary winding 62 may have its phase windings 66, 68 and 70 connected in Y, as shown, with its output terminals 72, 74 and 76 connected to line conductors 16, 18 and 20, respectively. The neutral 78 of the Y connected to primary winding 62 may be connected to the neutral conductor 28 of the generator 10.

The secondary winding 64 may have its phase windings 80, 82 and 84 connected in delta, with its output terminals 86, 88 and 90 connected to input terminals 56, 58 and 60, respectively, of power amplifier 42.

The arrangement of the secondary winding 64 shown, allows control from zero degrees to 120 degrees in the output waveform, where the zero degree point is defined as the point in the three-phase full-wave rectifier voltage at which the controlled rectifiers must be fired to obtain the maximum theoretical direct-current output voltage of 1.35 times the applied alternating current RMS voltage. Other well known delta and Y arrangements of the secondary winding 64 may be utilized to provide control from zero degrees to 150°, or from 30° to approximately 175° in the output voltage waveform.

The output conductors 92 and 94 of power amplifier 42 are connected in circuit relation with the field winding 12 through conductors 96 and 98, respectively, with a commutating rectifier, such as a semiconductor diode 100, being connected across conductors 96 and 98. Thus, the average excitation potential applied to field winding 12 is determined by the point in the voltage half cycle that controlled rectifiers 44, 46 and 48 are fired.

In order to provide an alternating potential to each of the regulating and firing control circuits 34, 36 and 38 having the desired phase relationship with the alternating output potential from generator 10 and with the alternating potential applied to the anode electrodes $a$ of controlled rectifiers 44, 46 and 48, transformer 40 may have an additional secondary winding 102. Secondary winding 102 may have its phase windings 104, 106 and 108 connected in Y to maintain the same phase relationship as the alternating output potential of generator 10, and its output terminals 110, 112 and 114 are connected in circuit relation with regulating and firing control circuits 34, 36 and 38, respectively. The connection of neutral 116 of secondary winding 102 will be described hereinafter.

The sensing means 32 for obtaining a unidirectional potential proportional to the electrical quantity to be regulated, which in this instance is the output potential of generator 10, may comprise a single phase, full-wave bridge type rectifier 118, having rectifiers 121, such as silicon diodes each having an anode electrode $a$ and a cathode electrode $c$. Although the sensing rectifier 118 is shown as being single-phase, it will be understood that it may also be three-phase, thus regulating the average of the three-phase voltages. Bridge rectifier 118 has its input terminals 120 and 122 connected to neutral conductor 28 and to line conductor 18, respectively, and its output terminals 124 and 126 connected in circuit relation with a waveform filter 128. Waveform filter 128 may include resistors 130 and 132 and capacitors 134 and 136, with resistors 130 and 132 being connected in series circuit relation with the positive terminal 124 of bridge rectifier 118 and capacitors 134 and 136 being connected across the output conductors of bridge rectifier 118 in a well known manner. Resistor 138 and capacitor 140 form a lead network, which may be used to modify the loop gain and phase shift characteristics to obtain stable operation and good transient performance. Adjustable resistor 142 is the voltage adjustment potentiometer which is used to set the generator voltage at the desired value.

The regulating and firing control circuits, such as regulating and firing control circuit 34, each utilize a unijunction transistor 144 having a rectifying contact or emitter junction E, and two ohmic contacts base-one (B1) and base-two (B2). If the voltage applied to emitter E is less than the voltage applied across base-one and base-two, times a constant called the intrinsic stand-off ratio $n$ of the unijunction transistor, the emitter will be reverse biased and only leakage current will flow. When the voltage applied to the emitter E exceeds the voltage applied across base-one and base-two times the intrinsic stand-off ratio $n$, the emitter E will be forward biased, allowing emitter current to flow. This characteristic of the unijunction transistor 144 is utilized to provide a signal at the proper point in the voltage half cycle applied to the anode electrode $a$ of controlled rectifiers 44, 46 and 48, to obtain an average potential which will maintain the output potential of alternating current generator 10 at the desired magnitude.

More specifically, a unidirectional voltage proportional to the output voltage of generator 10 is applied across base-one and base-two of unijunction transistor 144. The unidirectional voltage across resistors 146 and 154 is proportional to the output voltage of generator 10 and it is applied to base-one and base-two through emitter-follower connected transistor 148. Transistor 148 has a base electrode $b$, a collector electrode $c$ and an emitter electrode $e$. A three-phase, half-wave rectifier 150, having rectifiers 152, is connected to taps 103, 105 and 107 on phase windings 104, 106 and 108, respectively, of secondary winding 102 to provide the desired voltage, and to collector electrode $c$ of transistor 148 through bus 154. The voltage at the emitter electrode $e$ follows the voltage applied to the base electrode $b$, with the transistor 148 and rectifier 150 being utilized to reflect a high impedance into the sensing circuit 32 to reduce filter requirements and to minimize the affect of variations in the interbase resistance of unijunction transistor 144. If additional filtering is utilized in the sensing circuit 32, and the circuit is to operate at a fixed temperature, or an extremely narrow temperature range, the voltage across resistor 146 may be applied directly to base-two of unijunction transistor 144, eliminating transistor 148 and rectifier 150. Generally, however, the system temperature range will be such that transistor 148 and rectifier 150 will be required.

Adjustable resistor 146 is required to allow adjustments to be made because of variations in the intrinsic stand-off ratio $n$ of the unijunction transistor 144. Resistor 154 is a part of the voltage divider network for developing the unidirectional potential proportional to the output potential of generator 10, and resistor 154 may also be a temperature sensitive resistor to compensate for component parameter changes over the operating temperature range of the equipment to minimize variations in output voltage due to temperature drift. Thus, a unidirectional potential proportional to the output potential of generator 10 is applied across the base contacts B1 and B2 of unijunction transistor 144, with the return to rectifier 118 being through resistor 156, and conductors 158 and 160. The voltage between the base contacts B1 and B2 times the intrinsic stand-off ratio ($n$) of the unijunction transistor 144 is a value which is proportional to the output potential of generator 10, and varies with variations in the output potential. The timing of the firing pulse applied to the gate electrode $g$ of controlled rectifier 44 is made responsive to variations in the output potential of generator 10 by applying a reference voltage to the emitter E of unijunction transistor 148 each positive voltage half cycle which is sufficient voltage to fire controlled rectifier 44 when the anode electrode $a$ of controlled rectifier 44 becomes more positive than its cathode electrode $c$, and has a substantially linear, gradual slope during the period of time that controlled rectifier may be fired, which gives high gain and substantially linear firing angle change as a function of the sensed voltage. The voltage applied to emitter E of unijunction transistor 144 is regulated to insure that the voltage slope of the reference voltage is constant and repetitive from cycle to cycle.

The voltage applied to the emitter E is developed from phase 108 of secondary winding 102, with terminal 110 being connected to blocking rectifier 162, which allows only the positive half cycles of current from terminal 110 to reach resistors 164 and 170 and the voltage regulating rectifiers 166 and 168, which may be Zener diodes, each having a cathode electrode $c$ and an anode electrode $a$. Zener diodes 166 and 168 provide a regulated voltage supply for capacitor 172. Resistor 164 has a relatively small magnitude and resistor 170 has a relatively large magnitude, for purposes which will be hereinafter described. A blocking rectifier 174, such as a silicon diode, having an anode electrode $a$ and cathode electrode $c$ is connected from the junction 176 between Zener diodes 166 and 168, and the junction 178 between resistor 170 and capacitor 172. Blocking rectifier 174 is poled to allow current flow from junction 176 to junction 178.

Conductor 158 is connected to the neutral connection 116 of secondary winding 102 to provide a return path for the current phase winding 108. Rectifier 180 and resistor 182 provide a discharge path for capacitor 172 to discharge at the end of the voltage half cycle in the event the capacitor has not been discharged through the unijunction transistor 144, thus resetting and synchronizing capacitor 172 for the next positive voltage half cycle. Capacitor 184 prevents false triggering of the unijunction transistors in the other two phases when unijunction transistor 144 is fired.

In describing the operation of the regulating and firing circuit 34, reference will be made to FIGS. 2 and 3, which show voltage waveforms at specific points in the schematic diagram of FIG. 1 and aid in its understanding.

In operation, assume that terminal 110 of phase winding 108 is just starting positive. The waveform of the alternating potential at terminal 110 is shown in FIG. 2 as curve 186. The positive half cycle of voltage is allowed to pass the blocking rectifier 162 and is applied to capacitor 172 through resistor 170, which has a large magnitude, and resistor 164. At the very low voltage at the start of the positive half cycle, the charging of capacitor 172 is almost negligible. When the voltage across Zener diode 166 reaches its Zener or breakdown voltage, capacitor 172 starts to charge rapidly through resistor 164, which has a relatively small magnitude, Zener diode 166 and blocking rectifier 174, thus establishing a low resistance circuit in parallel with resistor 170. When the voltage across capacitor 172 reaches the Zener voltage of Zener diode 168, the cathode $c$ of blocking rectifier 174 becomes more positive than its anode electrode $a$, reverse biasing rectifier 174 and causing it to switch to its blocking mode. The charging path for capacitor 172 is then through the relatively large impedance means or resistor 170. The charge on capacitor 172 is shown relative to the voltage at terminal 110 in curve 188 of FIG. 2, with the curves indicating the relative magnitudes of the two voltages. It will be observed that the charging rate of capacitor 172 is very slow until point 190 is reached. Point 190 indicates the breakdown of Zener diode 166, allowing capacitor 172 to charge rapidly along slope 192. At point 194, the charging rate of capacitor 172 becomes very slow again, with point 194 indicating when blocking rectifier 174 switched to its blocking state, forcing capacitor 172 to be charged through resistors 170 and 164.

The voltage curve 188 of capacitor 172 strikes voltage curve 186 at point 196, which is approximately at the 175° point, and then the capacitor 172 discharges along curve 198 during the negative half cycle of voltage waveform 186, and is ready for the next positive half cycle. Because of the voltage regulating action of Zener diodes 166 and 168, the charging rate of capacitor 172 will be the same during each positive half cycle, enabling the charge on the capacitor 172 to be used as a reference voltage.

In order to more clearly show the action of regulating and firing circuit 34, the voltage curves 186 and 188 of FIG. 2 are shown again in FIG. 3, with the slope of the capacitor voltage curve 188 being greatly magnified.

The complete capacitor voltage curve 188 illustrates the voltage waveform across capacitor 172 in the event the capacitor voltage never reaches the product of the voltage across the base contacts B1 and B2 and the intrinsic stand-off ratio ($n$) of the unijunction transistor. This product will be referred to as $nV_{B1B2}$, hereinafter, for simplicity. If $nV_{B1B2}$ exceeds the maximum voltage of the capacitor 172, the output of generator 10 is too high and the controlled rectifier 44 would not be turned on during that particular half cycle. If $nV_{B1B2}$, however, is less than the maximum capacitor voltage represented by point 196 in FIGS. 2 and 3, at some point during the voltage half cycle the emitter voltage E, represented by the capacitor voltage curve 188, will exceed $nV_{B1B2}$ and unijunction transistor 144 will fire, allowing the capacitor 172 to discharge through resistor 156. The discharging current through resistor 156 develops a voltage across resistor 156 having a very rapid rate of rise and is used to fire controlled rectifier 44 through conductor 199. In FIG. 3, curve 200 represents the voltage level of $nV_{B1B2}$, with the capacitor voltage curve 188 crossing curve 200 at point 202, thus switching the unijunction transistor 144 to its conducting mode near 90° in the cycle. The voltage of capacitor 172, instead of continuing to increase, discharges along curve 204, and is thus ready for the next positive half cycle. If the product of the intrinsic stand-off ratio $n$ and $V_{B1B2}$ increases, indicating that the output potential of generator 10 is increased, it will be noted that curve 200 will strike curve 188 later during the half cycle, and controlled rectifier 44 will be rendered conductive for a shorter period of time, reducing the average excitation potential applied to the field winding 12 and reducing the output voltage of generator 10. If the product of the intrinsic stand-off ratio $n$ and $V_{B1B2}$ decreases, indicating that the output potential of generator 10 has decreased, curve 200 will strike curve 188 earlier in the voltage half cycle, rendering controlled rectifier 44 conductive for a longer period of time and increasing the average excitation potential applied to the field winding 12 and increasing the output potential of generator 10.

It is important to note that the charging rate of capacitor 172 is always constant in each positive half cycle, with the determining factor of when the controlled rectifier is rendered conductive being the voltage $V_{B1B2}$ applied across the base contacts B1 and B2 of unijunction transistor 144. It is also important to note that the method of synchronizing the capacitor 172 after each voltage cycle with the alternating potential does not turn on the controlled rectifiers at the end of each cycle.

The very gradual, substantially linear slope of the capacitor charging rate after point 194 provides a circuit with a very high gain. The more gradual the slope, the higher the gain, as the voltage $nV_{B1B2}$ has to change less to vary the firing angle over the controlled range. Since the slope of curve 188 from the point 194 to point 196 is determined by the magnitude of resistance of resistor 170 in conjunction with the capacitance of capacitor 172, the gain of the system may be selected by the selection of resistor 170.

The Zener voltage of Zener diode 166 is selected to be low enough that it conducts early in the cycle but high enough that the voltage across Zener diodes 166 and 168 is sufficient to furnish a voltage supply to charge capacitor 172 after the charging path of capacitor 172 is changed at point 194 to include resistor 170. It is necessary to have capacitor 172 charged to a voltage sufficient to fire the controlled rectifier 44 as early in the cycle as feasible, and then the charging rate is changed to provide the desired high gain. Resistor 164 is selected to allow capacitor 172 to charge rapidly and still restrict power dissipation and the current through diodes 162, 166 and 174 and resistor 164 to reasonable levels.

The Zener voltage of Zener diode 168 is selected to have a value which is high enough to fire controlled rectifier 44 and also low enough that the instantaneous voltage of terminal 110 (curve 186 in FIGS. 2 and 3) will fall below the Zener voltage at a point as close to 180° as possible. This is required so that control may be maintained to as near 180° in the cycle as possible, for those connections of transformer 40 that will allow control to the 180° point. Thus, the charging rate of capacitor 172 has two slopes, the first being a steep slope 192 to enable capacitor 172 to charge rapidly enough to obtain a voltage of sufficient magnitude to fire the controlled rectifier 44 at the point in the cycle which will give maximum output, and the second slope being substantially flat and very gradual to provide a high gain over the portion of the voltage half cycle that the controlled rectifier 44 may be fired. As hereinbefore stated, the connection of transformer 40 shown in FIG. 1 allows control over a period of 120°, from the zero degree point to the 120 degree point in the output voltage waveform because of the difference in phase between the voltage applied to regulating and firing circuit 34 by the Y connected secondary winding 102, and the voltage applied to power amplifier 42 and controlled rectifier 44 from delta connected secondary winding 64. Other transformer arrangements may be utilized, as hereinbefore stated, to provide control from 30° to 175°, or from substantially zero degrees to 150 degrees.

The remaining regulating and firing control circuits 36 and 38 are similar to circuit 34, with terminals 206 being connected to transistor 148, and terminals 208 and 210 being connected to resistors similar to resistors 146. Conductors 212 and 214 parallel resistor 146 and provide a unidirectional potential proportional to the output potential of generator 10. Terminals 216 are connected to the other terminals 112 and 114 of secondary winding 102, and to blocking rectifiers similar to blocking rectifier 162. Terminals 218 are connected to the return conductor 160, similar to the return conductor 158 in circuit 34. Terminals 220 are connected to base-one (B1) of unijunction transistors similar to unijunction transistor 144.

In summary, a static regulating and firing control circuit for a dynamoelectric machine has been disclosed which has a very high gain and substantially linear firing angle control over the operating range. The gain, being determined by the value of one resistor, is easily adjustable if desired. The system is constructed of low cost components and does not require any complex circuitry. The firing pulses for controlling the controlled rectifiers in the power amplifier have a fast rise time, and are synchronized with the altenating potential applied to the controlled rectifiers, without turning on the controlled rectifiers at the end of each voltage cycle. Further, the firing circuit has continuous control over the controllable output range. The desired controllable output range may be selected by utilizing the proper transformer connections.

Although FIG. 1 illustrates the power amplifier 42 being connected directly to the field winding 12 of alternating current generator 10, it is to be understood that additional stages of amplification, rotary or static, may be provided between the power amplifier 42 and field winding 12 of generator 10.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

I claim as my invention:

1. A regulatng system for a dynamoelectric machine having output terminals and an excitation field winding comprising, first means connected in circuit relation with said output terminals producing a first signal proportional to the output voltage of said dynamoelectric machine, second means connected in circuit relation with said output terminals producing a second signal having a predetermined slope, third means having first, second and third terminals and the characteristic of blocking current flow from the third to the first terminal until the voltage applied to the third terminal exceeds the product of the voltage applied across the first and second terminals and a constant, said first signal being applied across the first and second terminals of said third means, said second signal being applied to the third terminal of said third means, fourth means connected in circuit relation with said third means producing a third signal when said second signal exceeds the product of said first signal and said constant, and fifth means connected in circuit relation with said fourth means and said field winding providing a unidirectional excitation potential for said field winding in response to said third signal to maintain the output voltage of said dynamoelectric machine at a predetermined magnitude.

2. A regulating system for a dynamoelectric machine having output terminals and an excitation field winding comprising, first means connected in circuit relation with said output terminals producing a unidirectional voltage proportional to the output voltage of said dynamoelectric machine, second means connected in circuit relation with said output terminals producing a reference voltage having a predetermined slope during each positive half cycle of the output voltage of said dynamoelectric machine, a unijunction transistor having first and second base contacts and an emitter, said first means being connected in circuit relation with the first and second base contacts of said unijunction transistor and applying said unidirectional voltage thereto, said second means being connected in circuit relation with the emitter of said unijunction transistor and applying said reference voltage thereto, third means connected in circuit relation with said unijunction transistor producing a firing voltage when said reference voltage exceeds the product of said unidirectional voltage and the intrinsic stand-off ratio of said unijunction transistor, and rectifier means including controlled rectifiers connected in circuit relation with said output terminals, said third means, and said field winding, said firing voltage switching said controlled rectifiers to their conductive state to provide an excitation potential for said field winding which maintains the output voltage of said dynamoelectric machine at a predetermined magnitude.

3. A regulating system for a dynamoelectric machine having output terminals and an excitation field winding comprising, first means connected in circuit relation with said output terminals producing a unidirectional voltage proportional to the output voltage of said dynamoelectric machine, second means connected in circuit relation with said output terminals producing a reference voltage having a predetermined slope during each positive half cycle of the output voltage of said dynamoelectric machine, said second means including a capacitor and means for charging said capacitor at first and second predetermined rates, said first charging rate charging said capacitor to a predetermined voltage in a predetermined time, said second charging rate producing said reference voltage, a unijunction transistor having first and second base contacts and an emitter, said first means being connected in circuit relation with the first and second base contacts of said unijunction transistor and applying said unidirectional voltage thereto, said second means being connected in circuit relation with the emitter of said unijunction transistor and applying said reference voltage thereto, third means connected in circuit relation with said unijunction transistor producing a signal when said reference voltage exceeds the product of said unidirectional voltage and the intrinsic stand-off ratio of said unijunction transistor, and rectifier means connected in circuit relation with said output terminals, said third means, and said field winding, said rectifier means providing an excitation potential for said field winding responsive to said signal which maintains the output voltage of said dynamoelectric machine at a predetermined magnitude.

4. A regulating system for a dynamoelectric machine having output terminals and an excitation field winding comprising, first means connected in circuit relation with said output terminals producing a unidirectional voltage proportional to the output voltage of said dynamoelectric machine, second means connected in circuit relation with said output terminals producing a reference voltage having a predetermined slope during each positive half cycle of the output voltage of said dynamoelectric machine, said second means including a capacitor, first and second impedance means, and means for first charging said capacitor through said first impedance means to a predetermined voltage in a predetermined time and then through said second impedance means, the magnitude of said second impedance means determining the slope of said reference voltage and the gain of said regulator system, a unijunction transistor having first and second base contacts and an emitter, said first means being connected in circuit relation with the first and second base contacts of said unijunction transistor and applying said unidirectional voltage thereto, said second means being connected in circuit relation with the emitter of said unijunction transistor and applying said reference voltage thereto, third means connected in circuit relation with said unijunction transistor producing a signal when said reference voltage exceeds the product of said unidirectional voltage and the intrinsic stand-off ratio of said unijunction transistor, and rectifier means connected in circuit relation with said output terminals, said third means, and said field winding, said rectifier means providing an excitation potential for said field winding responsive to said signal which maintains the output voltage of said dynamoelectric machine at a predetermined magnitude.

5. A regulating system for a dynamoelectric machine having output terminals and an excitation field winding comprising, first means including first rectifier means and an NPN transistor having base, collector, and emitter electrodes, said first rectifier means being connected in circuit relation with said output terminals producing a unidirectional voltage at the emitter electrode of said NPN transistor proportional to the output voltage of said dynamoelectric machine, second means connected in circuit relation with said output terminals producing a reference voltage having a predetermined slope during each positive half cycle of the output voltage of said dynamoelectric machine, said second means including a capacitor, first and second impedance means, and means for first charging said capacitor through said first impedance means to a predetermined voltage in a predetermined time and then through said second impedance means, the magnitude of said second impedance means determining the slope of said reference voltage and the gain of said regulator system, a unijunction transistor having first and second base contacts and an emitter, said first means being connected in circuit relation with the first and second base contacts of said unijunction transistor and applying said unidirectional voltage thereto, said second means being connected in circuit relation with the emitter of said unijunction transistor and applying said reference voltage thereto, third means connected in circuit relation with said unijunction transistor producing a signal when said reference voltage exceeds the product of said unidirectional voltage and the intrinsic stand-off ratio of said unijunction transistor, and second rectifier means connected in circuit relation with said output terminals, said third means, and said field winding, said rectifier means providing an excitation potential for said field winding responsive to said signal which maintains the output voltage of said dynamoelectric machine at a predetermined magnitude.

6. A regulating system for a dynamoelectric machine having output terminals and an excitation field winding comprising, rectifier means connected in circuit relation with said output terminals producing a unidirectional voltage proportional to the output voltage of said dynamolectric machine, transformer means having first, second and third windings, said first winding being connected in circuit relation with said output terminals, reference means connected in circuit relation with said second winding producing a reference voltage having a predetermined slope during each positive half cycle of the output voltage of said dynamoelectric machine, said reference means including a capacitor, first and second impedance means, and means for first charging said capacitor through said first impedance means to a predetermined voltage in a predetermined time and then through said second impedance means, the magnitude of said second impedance means determining the slope of said reference voltage and the gain of said regulator system, a unijunction transistor having first and second base contacts and an emitter, said rectifier means being connected in circuit relation with the first and second base contacts of said unijunction transistor and applying said unidirectional voltage thereto, said reference means being connected in circuit relation with the emitter of said unijunction transistor and applying said reference voltage thereto, third impedance means connected in circuit relation with said unijunction transistor producing a firing voltage when said reference voltage exceeds the product of said unidirectional voltage and the intrinsic stand-off ratio of said unijunction transistor, and power amplifier means including controlled rectifier means connected in circuit relation with the third winding of said transformer means, said third impedance means, and said field winding, said firing voltage being applied to said controlled rectifier means to switch said controlled rectifier means to a conductive state and provide an excitation potential for said field winding which maintains the output voltage of said dynamoelectric machine at a predetermined magnitude.

7. A regulator system for a three phase dynamoelectric machine having output terminals and an excitation field winding comprising, rectifier means connected in circuit relation with said output terminals producing a unidirectional voltage proportional to the output voltage of said dynamoelectric machine, three-phase transformer means having first, second and third windings, said first winding being connected in circuit relation with said output terminals, first, second and third reference means each being connected in circuit relation with a different phase of the second winding of said three-phase transformer means producing reference voltages synchronized with each phase and each having a predetermined slope, each of said reference means including a capacitor, first and second impedance means, and means for first charging said capacitor through said first impedance means to a predetermined voltage in a predetermined time and then through said second impedance means, the magnitude of said second impedance means determining the slope of said reference voltage and the gain of said regulator system, first, second and third unijunction transistors each having first and second base contacts and an emitter, said rectifier means being connected in circuit relation with the first and second base contacts of each of said first, second and third unijunction transistors and applying said unidirectional voltage thereto, each of said reference means being connected in circuit relation with the emitter of one of said first, second and third unijunction transistors and applying said reference voltage thereto, third impedance means connected in circuit relation with each of said first, second and third unijunction transistors and producing a firing voltage when said reference voltage exceeds the product of said unidirectional voltage and the intrinsic stand-off ratio of each unijunction transistor, and power amplifier means including controlled rectifier means connected in circuit relation with the third winding of said transformer means, said third impedance means, and said field winding, said firing voltages being applied to said controlled rectifier means to switch said controlled rectifier means to a conductive state and provide an excitation potential for said field winding which maintains the output voltage of said dynamoelectric machine at a predetermined magnitude.

8. A firing circuit for producing firing pulses suitable for switching controlled rectifiers to their conductive mode at a firing angle during a half cycle of an electrical quantity provided by a source of alternating potential determined by the magnitude of a unidirectional signal comprising, first means connected in circuit relation with said source of alternating potential to allow only positive half cycles of current to flow, a capacitor, first and second impedance means, second means connected in circuit relation with said first means, said first and second impedance means, and said capacitor for charging said capacitor first through said first impedance means at a first predetermined rate to a predetermined voltage and then through said second impedance means at a second predetermined rate, a unijunction transistor having first and second base contacts and an emitter, said unidirectional signal being applied to the first and second base contacts of said unijunction transistor, the emitter of said unijunction transistor being connected in circuit relation with said capacitor and responsive to the charging rate of said capacitor, third impedance means connected in circuit relation with said unijunction transistor and producing a firing pulse when the charge on said capacitor exceeds the product of said unidirectional voltage and the intrinsic stand-off ratio of said unijunction transistor.

9. A firing circuit for producing firing pulses suitable for switching controlled rectifiers to their conductive mode at a firing angle during the half cycle of voltage from a source of alternating potential determined by the magnitude of a unidirectional signal comprising, rectifier means connected in circuit relation with said source of alternating potential to allow only positive half cycles of current to flow, first means connected in circuit relation with said rectifier means for limiting the magnitude of positive half cycles of voltage, a capacitor, first and second impedance means, second means connected in circuit relation with said rectifier means, said first and second impedance means, and said capacitor for charging said capacitor first through said first impedance means at a first predetermined rate to a predetermined voltage and then through said second impedance means at a second predetermined rate, a unijunction transistor having first and second base contacts and an emitter, said unidirectional signal being applied to the first and second base contacts of said unijunction transistor, the emitter of said unijunction transistor being connected in circuit relation with said capacitor and responsive to the charging rate of said capacitor, third impedance means connected in circuit relation with said unijunction transistor and producing a firing pulse when the charge on said capacitor exceeds the product of said unidirectional voltage and the intrinsic stand-off ratio of said unijunction transistor.

References Cited
UNITED STATES PATENTS

| | | | |
|---|---|---|---|
| 2,896,149 | 7/1959 | Lowry et al. | 322—28 |
| 3,008,082 | 11/1961 | Schlicher | 322—28 |
| 3,151,288 | 9/1964 | Avizienis et al. | 322—28 |
| 3,214,599 | 10/1965 | Wellford | 322—28 X |

MILTON O. HIRSHFIELD, *Primary Examiner.*

J. D. TRAMMEL, *Assistant Examiner.*